(12) United States Patent
Hasegawa et al.

(10) Patent No.: US 9,887,617 B2
(45) Date of Patent: Feb. 6, 2018

(54) POWER CONVERSION DEVICE AND CONTROL METHOD THEREOF

(71) Applicant: Kabushiki Kaisha Toshiba, Minato-ku (JP)

(72) Inventors: Ryuta Hasegawa, Hino (JP); Shinya Kono, Hachioji (JP); Takashi Fujita, Tokyo (JP); Teruyuki Ishizuki, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/966,130

(22) Filed: Dec. 11, 2015

(65) Prior Publication Data

US 2016/0190908 A1 Jun. 30, 2016

(30) Foreign Application Priority Data

Dec. 24, 2014 (JP) .................................. 2014-260441

(51) Int. Cl.
*H02M 7/487* (2007.01)
*H02M 1/12* (2006.01)

(52) U.S. Cl.
CPC ............. *H02M 1/12* (2013.01); *H02M 7/487* (2013.01)

(58) Field of Classification Search
CPC ................................ H02M 1/12; H02M 7/487
USPC ..................................................... 363/39–43
See application file for complete search history.

(56) References Cited

U.S. PATENT DOCUMENTS

| 5,436,819 | A | * | 7/1995 | Mikami | .................. | H02M 1/38 |
| | | | | | | 363/132 |
| 5,886,888 | A | | 3/1999 | Akamatsu et al. | | |
| 6,490,185 | B1 | * | 12/2002 | Yamanaka | ............ | H02M 7/487 |
| | | | | | | 363/132 |
| 6,594,161 | B2 | * | 7/2003 | Jansen | .............. | H02M 3/33592 |
| | | | | | | 363/21.13 |

(Continued)

FOREIGN PATENT DOCUMENTS

| JP | 2002-78346 A | 3/2002 |
| JP | 2003-143865 A | 5/2003 |
| JP | 2014-100025 | 5/2014 |

OTHER PUBLICATIONS

Received search report from STIC EIC 2800 searcher John DiGeronimo dated Sep. 30, 2016.*

(Continued)

*Primary Examiner* — Jue Zhang
*Assistant Examiner* — Htet Z Kyaw
(74) *Attorney, Agent, or Firm* — Oblon, McClelland, Maier & Neustadt, L.L.P.

(57) ABSTRACT

According to one embodiment, there is provided a power conversion device, including a control unit configured to control ON/OFF of a switching element of a neutral-point-clamped power conversion device unit, wherein the control unit drives the power conversion device unit by a one-pulse control, controls a phase difference of an output voltage of the power conversion device unit with respect to a reference phase of to control an active current component of an output current of the power conversion device unit, and controls ON/OFF based on: (a) a phase angle for eliminating a predetermined odd-order harmonic component of the output voltage; and (b) a sum of the reference phase and the phase difference.

4 Claims, 4 Drawing Sheets

(56) References Cited

U.S. PATENT DOCUMENTS

| | | | | |
|---|---|---|---|---|
| 6,594,164 B2* | 7/2003 | Suzuki | H02M 1/4233 | 363/129 |
| 8,400,792 B2* | 3/2013 | Sato | H02M 7/487 | 363/127 |
| 9,287,797 B2* | 3/2016 | Hasegawa | H02M 5/4585 | |
| 9,509,230 B2* | 11/2016 | Abe | H02M 7/487 | |
| 9,531,296 B2* | 12/2016 | Urushibata | H02M 7/487 | |
| 2008/0291708 A1* | 11/2008 | Teichmann | H02M 1/32 | 363/50 |
| 2011/0134672 A1* | 6/2011 | Sato | H02M 1/10 | 363/126 |
| 2011/0141786 A1* | 6/2011 | Shen | H02M 7/487 | 363/131 |
| 2012/0281442 A1* | 11/2012 | Revelant | H02M 7/487 | 363/40 |
| 2013/0128632 A1* | 5/2013 | Yang | H02M 5/458 | 363/37 |
| 2014/0085954 A1* | 3/2014 | Hasegawa | H02M 7/483 | 363/132 |
| 2014/0119068 A1 | 5/2014 | Hasegawa et al. | | |
| 2014/0313804 A1* | 10/2014 | Urushibata | H02M 7/487 | 363/132 |
| 2015/0002106 A1* | 1/2015 | Inagaki | H02M 5/4585 | 322/79 |
| 2015/0200602 A1* | 7/2015 | Narimani | H02M 5/4585 | 363/37 |
| 2015/0214856 A1* | 7/2015 | Nakashima | H02M 7/487 | 363/131 |
| 2015/0303819 A1* | 10/2015 | Qu | H02M 7/487 | 363/35 |
| 2015/0303826 A1* | 10/2015 | Arnedo | H02M 7/537 | 363/97 |
| 2016/0111975 A1* | 4/2016 | Hasegawa | H02M 7/487 | 363/97 |
| 2016/0211749 A1* | 7/2016 | Okada | H02M 7/487 | |
| 2016/0329834 A1* | 11/2016 | Sugiyama | H02M 7/487 | |

OTHER PUBLICATIONS

Attached original and translated version of Japan foreign patent JP2002-78346A dated Mar. 15, 2002.*

Attached CA 2337921 A1 from canadian intellectual property office by STIC, the English language equivalent for JP 2002-78346 dated Aug. 25, 2001.*

A.Albert Martin Ruban, N. Hemavathi, N.Rajeswari, "Real time Harmonic Elimination PWM Control for Voltage Source Inverters", IEEE—International Conference on Advances in Engineering, Science and Management (ICAESM-2012), March 310,31,2012.*

Received STIC search report from EIC 2800 searcher Samir Patel dated Sep. 29, 2017.*

Extended European Search Report dated May 4, 2016 in Patent Application No. 15199351.6.

* cited by examiner

F I G. 1

F I G. 2

| | Output voltage | $S_{U1}$ | $S_{U2}$ | $S_{U3}$ | $S_{U4}$ | $S_{U5}$ | $S_{U6}$ | $S_{U7}$ | $S_{U8}$ |
|---|---|---|---|---|---|---|---|---|---|
| [1] | $+V_{DC}$ | ON | ON | OFF | OFF | OFF | OFF | ON | ON |
| [2] | $+V_{DC}/2$ | ON | ON | OFF | OFF | OFF | ON | ON | OFF |
| [3] | $+V_{DC}/2$ | OFF | ON | ON | OFF | OFF | OFF | ON | ON |
| [4] | 0 | ON | ON | OFF | OFF | ON | ON | OFF | OFF |
| [5] | 0 | OFF | ON | ON | OFF | OFF | ON | ON | OFF |
| [6] | 0 | OFF | OFF | ON | ON | OFF | OFF | ON | ON |
| [7] | $-V_{DC}/2$ | OFF | OFF | ON | ON | OFF | ON | ON | OFF |
| [8] | $-V_{DC}/2$ | OFF | ON | ON | OFF | ON | ON | OFF | OFF |
| [9] | $-V_{DC}$ | OFF | OFF | ON | ON | ON | ON | OFF | OFF |

POWER CONVERSION DEVICE AND CONTROL METHOD THEREOF

CROSS-REFERENCE TO RELATED APPLICATION

This application is based upon and claims the benefit of priority from Japanese Patent Application No. 2014-260441, filed Dec. 24, 2014, the entire contents of which are incorporated herein by reference.

FIELD

Embodiments described herein relate generally to a power conversion device and a control method thereof.

BACKGROUND

A power conversion device which outputs a large amount of power converts high voltage. Therefore, it is necessary to increase the withstand voltage of the power conversion device by using a switching element that has a high withstand voltage, or by connecting in series switching elements that do not have a high withstand voltage. Furthermore, it is necessary to increase the output voltage of the power conversion device by providing the power conversion device in multistages using a transformer.

In the case where the withstand voltage of the switching device is high, the switching loss of the switching device is large. Therefore, in some cases, by switching the switching element only once per cycle of an output frequency (one pulse) and shifting phases, a one-pulse control for eliminating a specific harmonic is carried out. This one-pulse control has an advantage in that the loss caused by switching the switching element can be reduced, and the harmonic can be reduced as well.

When applying Pulse Width Modulation (PWM) control to a Neutral-Point-Clamped (NPC) power conversion device, a harmonic component can be significantly reduced since the output voltage becomes even closer to the sine wave. However, in the case of using this power conversion device with a large amount of power, the loss caused by switching the switching element becomes greater.

DETAILED DESCRIPTION

In general, according to one embodiment, there is provided a power conversion device, including a neutral-point-clamped power conversion device unit connected to a DC power source comprising three potentials; and a control unit configured to control ON/OFF of a switching element of the power conversion device unit. The control unit drives the power conversion device unit by a one-pulse control, controls a phase difference of an output voltage of the power conversion device unit with respect to a reference phase of a system voltage to control an active current component of an output current of the power conversion device unit. The control unit controls ON/OFF of the switching element based on: (a) a phase angle for eliminating a predetermined odd-order harmonic component of an output voltage of the power conversion device unit; and (b) a sum of the reference phase and the phase difference.

Embodiments will be explained below with reference to the accompanying drawings. Note that portions common to these drawings will be denoted by the same reference numerals or the same reference numerals given suffixes, and a repetitive explanation will be omitted as needed.

Figure 1:
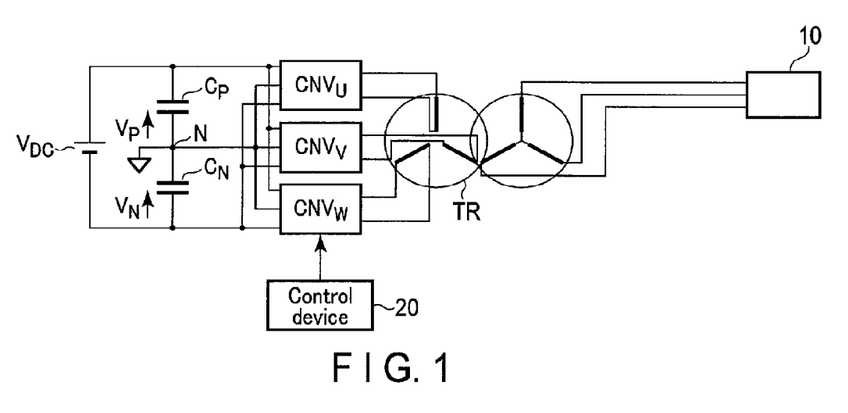
FIG. 1 shows an example of a circuit configuration of a power conversion device in the embodiment.

FIG. 1 shows an example of a circuit configuration of a power conversion device in the embodiment. This power conversion device converts a DC voltage into any voltage of any frequency and drives a three-phase (UVW phase) AC load 10 by this voltage.

A power conversion device unit $CNV_U$ of a U phase inputs a DC voltage $V_{DC}$. An output terminal of this power conversion device unit $CNV_U$ is connected to a U phase primary winding of a transformer TR.

A power conversion device unit $CNV_V$ of a V phase and a power conversion device unit $CNV_W$ of a W phase also input the DC voltage $V_{DC}$ in common with the U phase. Output terminals of these power conversion device units $CNV_V$ and $CNV_W$ are connected one-on-one to a V phase primary winding and a W phase primary winding of the transformer TR.

Based on a voltage command value, and a voltage value, a current value, and a phase of each unit, a control device 20 of the power conversion device units shown in FIG. 1 controls the power conversion device unit of each phase by outputting a gate command to a switching element constituting the power conversion device unit of each phase.

Figure 2:
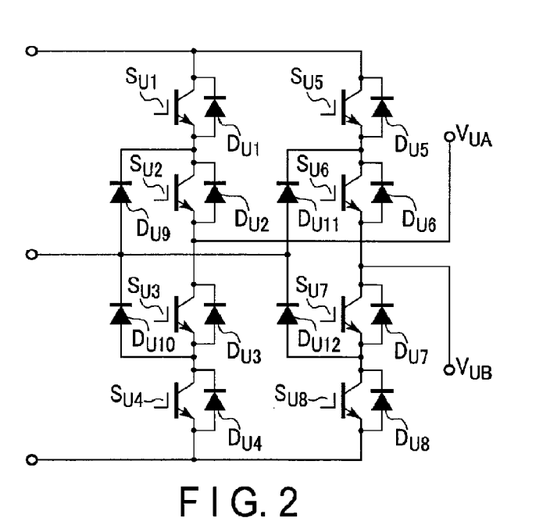
FIG. 2 shows an example of a circuit configuration of the power conversion device unit $CNV_U$ in the embodiment.

A detailed configuration of the power conversion device unit of each phase will be explained giving the U phase as an example. FIG. 2 shows an example of a circuit configuration of the power conversion device unit $CNV_U$ in the embodiment.

As shown in FIG. 1, on a direct current side of the power conversion device unit, a condenser $C_P$ on a high potential side and a condenser $C_N$ on a low potential side are connected in series. The power conversion device unit $CNV_U$ comprises eight self-arc-extinguishing shape switching elements $S_{U1}$, $S_{U2}$, $S_{U3}$, $S_{U4}$, $S_{U5}$, $S_{U6}$, $S_{U7}$, and $S_{U8}$, eight reflux diodes $D_{U1}$, $D_{U2}$, $D_{U3}$, $D_{U4}$, $D_{U5}$, $D_{U6}$, $D_{U7}$, and $D_{U8}$ connected one-on-one anti-parallel to all of the switching elements, and four clamp diodes $D_{U9}$, $D_{U10}$, $D_{U11}$, and $D_{U12}$ connected to mutual connection points (neutral point N) of condensers $C_P$ and $C_N$ shown in FIG. 2.

This power conversion device unit $CNV_U$ is an NPC full bridge power conversion device in which the above switching elements $S_{U1}$, $S_{U2}$, $S_{U3}$, and $S_{U4}$ are connected in series from the high potential side to the low potential side, and the above switching elements $S_{U5}$, $S_{U6}$, $S_{U7}$, and $S_{U8}$ are connected in series from the high potential side to the low potential side to construct two legs, and in which a mutual connection point of the above clamp diodes $D_{U9}$ and $D_{U10}$, and a mutual connection point of the above clamp diodes $D_{U11}$ and $D_{U12}$, are connected to the neutral point N. Furthermore, a potential difference $V_{UA}$-$V_{UB}$ between a connection point voltage $V_{UA}$ of the switching elements $S_{U2}$ and $S_{U3}$ and a connection point voltage $V_{UB}$ of the switching elements $S_{U6}$ and $S_{U7}$ is output to the transformer TR.

The configuration of the NPC leg will be explained in the following, giving the U phase as an example.

In the NPC leg of the U phase, four self-arc-extinguishing shape switching elements $S_{U1}$, $S_{U5}$, $S_{U3}$, and $S_{U4}$ are connected in series from the high potential side to the low potential side, and the reflux diodes $D_{U1}$, $D_{U2}$, $D_{U3}$, and $D_{U4}$ are connected one-on-one anti-parallel to these switching elements.

Furthermore, the clamp diode $D_{U9}$ is connected between an emitter of the switching element $S_{U1}$ and the neutral point N, and the clamp diode $D_{U10}$ is connected between the neutral point N and an emitter of the switching element Sm. An anode of the clamp diode $D_{U9}$ is connected to the neutral point N, and the cathode of the clamp diode $D_{U9}$ is connected to the emitter of the switching element $S_{U1}$. An anode of the clamp diode $D_{U10}$ is connected to the emitter of the switching element $S_{U3}$, and the cathode of the clamp diode $D_{U10}$ is connected to the neutral point N.

An emitter of the switching element $S_{U2}$ and a collector of the switching element $S_{U3}$ are connected to a U phase primary winding terminal of the transformer TR. An emitter of the switching element $S_{U6}$ and a collector of the switching element $S_{U7}$ are connected to the U phase primary winding terminal of the transformer TR. In this manner, the NPC leg of the U phase is constructed by the self-arc-extinguishing shape switching elements $S_{U1}$, $S_{U2}$, $S_{U3}$, and $S_{U4}$, the reflux diodes $D_{U1}$, $D_{U2}$, $D_{U3}$, and $D_{U4}$, and the clamp diodes $D_{U9}$ and $D_{U10}$. The configurations of the V-phase and W-phase NPC legs are the same as the configuration of the U-phase NPC leg.

The configurations of each of the power conversion device units $CNV_V$ of the V phase and each of the power conversion device units $CNV_W$ of the W phase are the same as the configuration of the power conversion device unit $CNV_U$ of the U phase.

The operation of the embodiment constructed in the above manner will be explained in detail.

Here, the voltage output method by a single power conversion device unit will be explained, giving the power conversion device unit $CNV_U$ of the U phase as an example.

The power conversion device unit $CNV_U$ has a full bridge configuration as mentioned above. When $V_{DC}$ is a direct current voltage obtained by the control device 20 controlling ON/OFF of the switching elements $S_{U1}$, $S_{U2}$, $S_{U3}$, $S_{U4}$, $S_{U5}$, $S_{U6}$, $S_{U7}$, and $S_{U8}$ that constitute this power conversion device unit $CNV_U$, the power conversion device unit $CNV_U$ is capable of outputting one of the five levels of voltage such as $-V_{DC}$, $-V_{DC}/2$, 0, $+V_{DC}/2$, or $+V_{DC}$ to the transformer TR.

Figure 3:
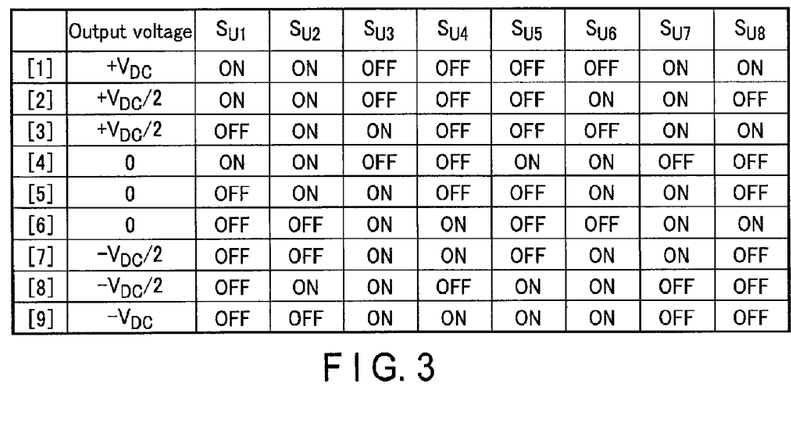
FIG. 3 is an example of a relationship between the output voltage of the power conversion device unit $CNV_U$, and the state of the switching elements in the embodiment.

FIG. 3 is an example of a relationship between the output voltage of the power conversion device unit $CNV_U$, and the state of the switching elements in the embodiment.

As shown in FIG. 3, the ON/OFF state of the switching elements $S_{U1}$, $S_{U2}$, $S_{U3}$, $S_{U4}$, $S_{U5}$, $S_{U6}$, $S_{U7}$, and $S_{U8}$, which is set for each output voltage of the power conversion device unit $CNV_U$, comprises nine types of patterns [1], [2], [3], [4], [5], [6], [7], [8], and [9].

When $S_{U1}$ is ON, $S_{U3}$ is OFF; $S_{U4}$ is ON, $S_{U2}$ is OFF; $S_{U5}$ is ON, $S_{U7}$ is OFF; and $S_{U8}$ is ON, $S_{U6}$ is OFF. In this manner, each of the plurality of switching elements in the same leg operates complementarily.

There are three types of switching patterns, such as [4], [5], and [6], in which the output voltage becomes 0, two types of switching patterns, such as [2] and [3], for $+V_{DC}/2$, and two types of switching patterns, such as [7] and [8], for $-V_{DC}/2$, which have redundancy.

By utilizing this redundancy, the control device 20 determines the switching pattern for suppressing the neutral point potential fluctuations of the NPC power conversion device unit.

When one of the two legs of the power conversion device unit is connected to the neutral point N and the other is not, that is, when one of the condensers $C_P$ and $C_N$ is included in the current path but the other is not, the neutral point potential fluctuates.

In other words, when the output voltage is $+V_{DC}/2$ (switching patterns [2], [3]) or $-V_{DC}/2$ (switching patterns [7], [8]), the neutral point potential fluctuates. The reason the neutral point potential fluctuates is because only one of the condensers $C_P$ and $C_N$ is charged or discharged.

The direction in which the neutral point potential fluctuates is determined by the leg connected to the neutral point N and the direction of the primary winding current $I_U$ of the transformer TR.

When the output voltage is $-V_{DC}$ or $+V_{DC}$, in addition to the switching patterns being uniquely determined, the current does not flow into the neutral point N. In other words, since an identical current flows in the two condensers $C_P$ and $C_N$, the neutral point potential does not fluctuate.

When the output voltage is 0, there are three types of switching patterns, such as [4], [5], and [6]. However, the control device 20 always selects switching pattern [5] so that by changing the ON/OFF state of a pair of (two) switching elements, the switching pattern can be shifted to one of [2], [3], [7], and [8].

For example, in order to shift the switching pattern from [5] to [2] to change the output voltage from 0 to $+V_{DC}/2$, the control device 20 needs to switch only a pair of switching elements formed by $SU_1$ and $SU_3$. However, in order to shift the switching pattern from [6] to [2], the control device 20 would need to switch the switching elements of the three pairs of $SU_1$ and $SU_3$, $SU_2$ and $SU_4$, and $SU_6$ and $SU_8$.

In this manner, since the control device 20 needs to turn the switching element ON/OFF for only one pair in order to shift the switching pattern from [5] to one of [2], [3], [7], and [8], the number of times of switching can be minimized.

In accordance with the above-mentioned switching pattern, a method of outputting to the transformer TR a voltage with a reduced low-order harmonic will be explained.

In addition to a fundamental (primary) wave, third-order, fifth-order, seventh-order, eleventh-order, thirteenth-order, seventeenth-order, nineteenth-order, twenty third-order, twenty fifth-order, and onward harmonics are superimposed on a square-wave voltage. In phases 0 to $\pi$, the output waveforms are bilaterally symmetric, and in phases $\pi$ to $2\pi$, the output waveforms are also bilaterally symmetric.

Even harmonics do not occur when outputting such a voltage waveform from the power conversion device unit to the transformer TR. Furthermore, the third-order harmonics eliminate each other at a three-phase line voltage.

The magnitude of the harmonic amplitude is determined by rising phases $\alpha_1$ and $\alpha_2$ of each voltage level allocated to each of the two legs mentioned above. Therefore, the latitude for determining the magnitude of the harmonic amplitude, that is, the adjustable phase, is the two phases of $\alpha_1$ and $\alpha_2$.

The amplitude of the harmonic voltage becomes smaller as the order of harmonics increases. Therefore, if the harmonics of lower orders are eliminated, an effect of significantly improving voltage distortion can be obtained. Therefore, it is necessary to eliminate the lowest third-order harmonics in the harmonics. However, as mentioned earlier, a 3k (k is a natural number) multiple order of harmonics, in other words, orders of harmonics in multiples of three, eliminate each other by outputting to the transformer TR the three-phase line voltage in which the phase is shifted 120 degrees. Therefore, in order to eliminate the fifth-order and seventh-order harmonics, that are next in order and higher than the third-order harmonic, it is necessary to satisfy the following formulas (1) and (2).

$$\cos(5\alpha_1)+\cos(5\alpha_2)=0 \quad \text{formula (1)}$$

$$\cos(7\alpha_1)+\cos(7\alpha_2)=0 \quad \text{formula (2)}$$

Figure 4:
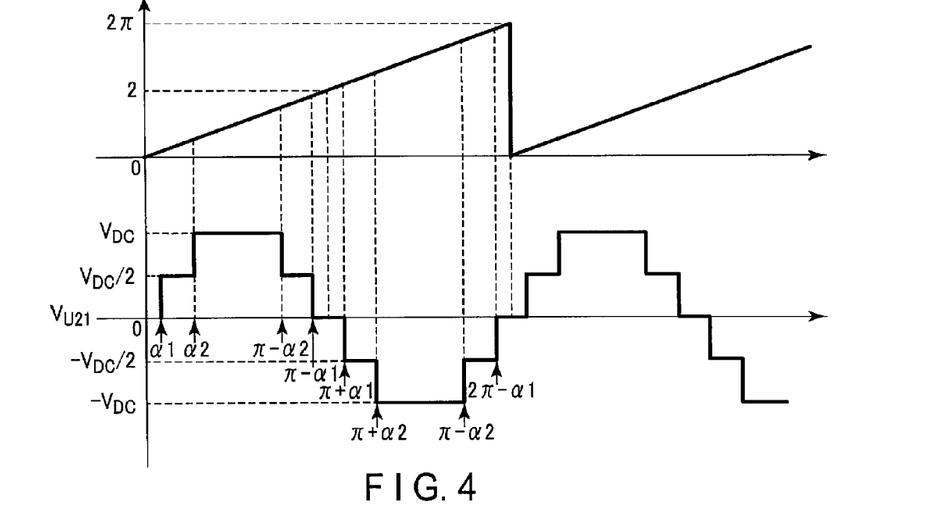
FIG. 4 shows an example of the relationship between the power conversion device unit $CNV_U$ and the phases in the embodiment.

By the above formulas (1) and (2), $\alpha_1$, $\alpha_2$ are uniquely calculated. Here, $\alpha_1$ is 0.09 rad, and $\alpha_2$ is 0.54 rad. FIG. 4 shows an example of the relationship between the power conversion device unit $CNV_U$ and the phases in the embodiment. By allocating these calculated phases $\alpha_1$ and $\alpha_2$ one-on-one to each of the two legs, a voltage in which the fifth-order and the seventh-order harmonics are eliminated in the manner shown in FIG. 4 is output from the power conversion device unit to the transformer TR.

Here, the voltage utilization rate (the ratio of basic-wave amplitude with respect to a DC input voltage) M is expressed in formula (3) below.

$$2(\cos(\alpha_1)+\cos(\alpha_2))/\pi=M \quad \text{formula (3)}$$

Since phases $\alpha_1$ and $\alpha_2$ are determined as values eliminating the fifth-order and seventh-order harmonics by the above formulas (1) and (2), the voltage utilization rate M is a fixed value. Therefore, the amplitude of the output voltage cannot be controlled in order to control the output current of the power conversion device unit. Thus, in the present embodiment, the three-phase output current is divided into an active current component and a reactive current component.

Figure 5:
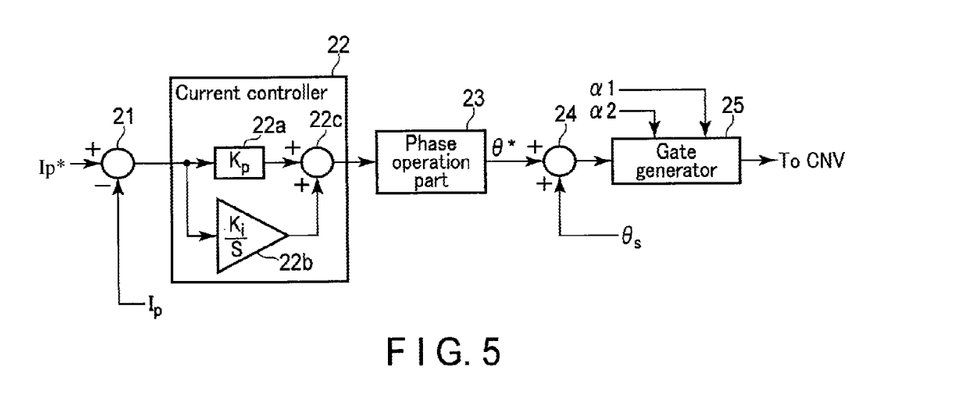
FIG. 5 is a block diagram showing a function configuration example of the control device of the power conversion device in the embodiment.

FIG. 5 is a block diagram showing a function configuration example of the control device of the power conversion device in the embodiment.

As shown in FIG. 5, the control device 20 comprises a subtractor 21, a current controller 22, a phase operation part 23, an adder 24, and a gate generator 25.

The subtractor 21 outputs to the current controller 22 the difference between an active current command value $I_P^*$ of the three-phase output current of the power conversion device unit and an active current component value $I_P$ of the output current of the power conversion device unit.

The current controller 22 comprises operation units 22a and 22b for performing proportional-integral control (PI control), and an adder 22c.

The operation unit 22a outputs to the adder 22c a value obtained by adding a feedback gain $K_P$ to the value output from the subtractor 21. The operation unit 22b outputs a value obtained by integrating the value output from the subtractor 21 and adding a feedback gain $K_i$ thereto to the adder 22c. The adder 22c outputs to the phase operation part 23 the sum of the output value received from the operation unit 22a and the output value received from the operation unit 22b.

The phase operation part 23 computes an arc sine of the output value received from the adder 22c to compute a phase difference $\theta^*$ of the output voltage of the power conversion device unit with respect to a reference phase $\theta_S$ of a system voltage.

The adder 24 outputs the sum of the reference phase $\theta_S$ of the system voltage and a phase difference $\theta^*$ of the output voltage of the power conversion device unit with respect to this reference phase $\theta_S$ to the gate generator 25. The gate generator 25 generates a gate control signal to be sent to the switching element of the power conversion device unit based on the output value received from the adder 24 and the phases $\alpha_1$ and $\alpha_2$, and outputs it to the switching element.

In this manner, by controlling the phase difference $\theta^*$ of the output voltage of the power conversion device unit with respect to the reference phase $\theta_S$, the active current component $I_P$ of the output current of the power conversion device unit can be controlled.

In the above manner, even in the case where the voltage utilization rate M is fixed, by applying the above phase control, the current control becomes possible in the same manner as in the case of controlling the voltage utilization rate M.

Figure 6:
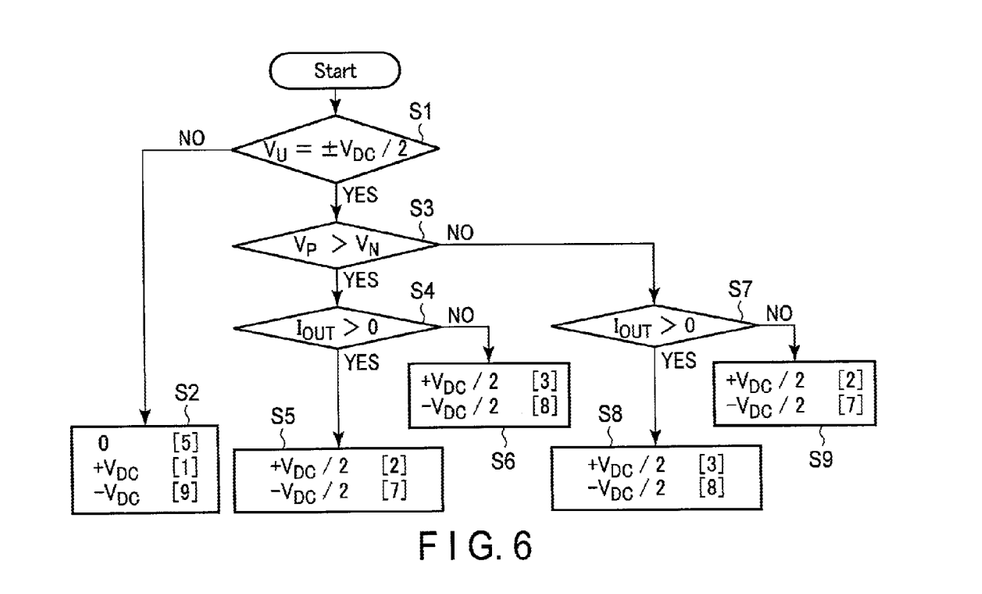
FIG. 6 is a flowchart showing an example of a switching method for controlling the neutral point potential fluctuations using the power conversion device in the embodiment.

FIG. 6 is a flowchart showing an example of a switching method for controlling the neutral point potential fluctuations using the power conversion device in the embodiment. FIG. 6 shows a switching method carried out by the control device 20 for controlling neutral point potential fluctuations when the power conversion device unit outputs $-V_{DC}/2$ or $+V_{DC}/2$ as an output voltage.

Here, the potential of the condenser $C_P$ is $V_P$, the potential of the condenser $C_N$ is $V_N$, and the direction in which an output current $I_U$ is fed (current direction) from the power conversion device unit to the transformer TR is a positive direction.

For example, the case will be explained in which an output voltage $V_U$ of the power conversion device unit $CNV_U$ is $\pm V_{DC}/2$ (YES in S1), the potential $V_P$ is greater than the potential $V_N$ (YES in S3), and the current direction is positive (YES in S4).

In this case, if the current is fed in a direction to charge the condenser $C_N$, the potential $V_N$ will increase, allowing the neutral point potential fluctuations to be suppressed.

At this time, if the control device 20 selects switching pattern [7] when intending to output voltage $-V_{DC}/2$, and selects switching pattern [2] when intending to output voltage $+V_{DC}/2$, the current is fed in a direction in which the potential $V_N$ nears the potential $V_P$, which allows the neutral point potential fluctuations to be suppressed (S5). In the case where the output voltage $V_U$ is not $\pm V_{DC}/2$ (NO in S1), when intending to output voltage zero, the control device 20 should select switching pattern [5], when intending to output voltage $+V_{DC}$, the control device 20 should select switching pattern [1], and when intending to output $-V_{DC}$, the control device 20 should select switching pattern [9].

Other examples in the case of $V_P>V_N$ will be explained.

In the case of $V_P>V_N$, and where the current direction is positive in the above manner, if the current is fed in a direction to be discharged from the condenser $C_P$, the potential $V_P$ will be lowered, allowing the neutral point potential fluctuations to be suppressed.

In the case of $V_P>V_N$, and where the current direction is negative (NO in S4), if the current is fed in a direction to be discharged from the condenser $C_P$, the potential $V_P$ will be lowered, allowing the neutral point potential fluctuations to be suppressed.

In the case of $V_P>V_N$, and where the current direction is likewise negative, if the current is fed in a direction to charge the condenser $C_N$, the potential $V_N$ will increase, allowing the neutral point potential fluctuations to be suppressed.

In the case of $V_P>V_N$, and where the current direction is negative as in the manner above, when intending to output voltage $-V_{DC}/2$, the control device 20 selects switching pattern [8], and when intending to output voltage $+V_{DC}/2$, the control device 20 selects switching pattern [3].

An example in the case of $V_P<V_N$ (NO in S3) will be explained.

In the case of $V_P>V_N$, and where the current direction is positive in the above manner, if the current is fed in a direction to charge the condenser $C_P$, the potential $V_P$ will increase, allowing the neutral point potential fluctuations to be suppressed.

In the case of $V_P>V_N$, and where the current direction is likewise positive, if the current is fed in a direction to be discharged from the condenser $C_N$, the potential $V_P$ will be lowered, allowing the neutral point potential fluctuations to be suppressed.

In the case of $V_P<V_N$, and where the current direction is positive as in the manner above, when intending to output voltage $-V_{DC}/2$, the control device 20 selects switching pattern [8], and when intending to output voltage $+V_{DC}/2$, the control device 20 selects switching pattern [3] (S8).

In the case of $V_P<V_N$, and where the current direction is negative (NO in S7), if the current is fed in a direction to be discharged from the condenser $C_N$, the potential $V_N$ will be lowered, allowing the neutral point potential fluctuations to be suppressed.

In the case of $V_P<V_N$, and where the current direction is likewise negative, if the current is fed in a direction to charge the condenser $C_P$, the potential $V_P$ will increase, allowing the neutral point potential fluctuations to be suppressed.

In the case of $V_P<V_N$, and where the current direction is negative as in the manner above, when intending to output voltage $-V_{DC}/2$, the control device 20 selects switching pattern [7], and when intending to output voltage $+V_{DC}/2$, the control device 20 selects switching pattern [2] (S9).

The state of switching patterns [3] and [7] is such that phase $\alpha_1$ is given as a threshold value to a leg comprising switching elements $S_{U1}$, $S_{U2}$, $S_{U3}$, and $S_{U4}$, and phase $\alpha 2$ is given as a threshold value to a leg comprising switching elements $S_{U5}$, $S_{U6}$, $S_{U7}$, and $S_{U8}$.

Likewise, the state of switching patterns [2] and [8] is such that phase $\alpha_2$ is given as a threshold value to a leg comprising switching elements $S_{U1}$, $S_{U2}$, $S_{U3}$, and $S_{U4}$, and phase a1 is given as a threshold value to a leg comprising switching elements $S_{U5}$, $S_{U6}$, $S_{U7}$, and $S_{U8}$.

In other words, the allocation of phases $\alpha_1$ and $\alpha_2$ to each leg is switched between switching patterns [3] and [7], and switching patterns [2] and [8].

In this manner, the control device 20 determines the switching pattern of the power conversion device unit $CNV_U$ in accordance with the magnitude of the potential $V_P$ and the potential $V_N$, and the direction of the output current $I_U$.

Figure 7:
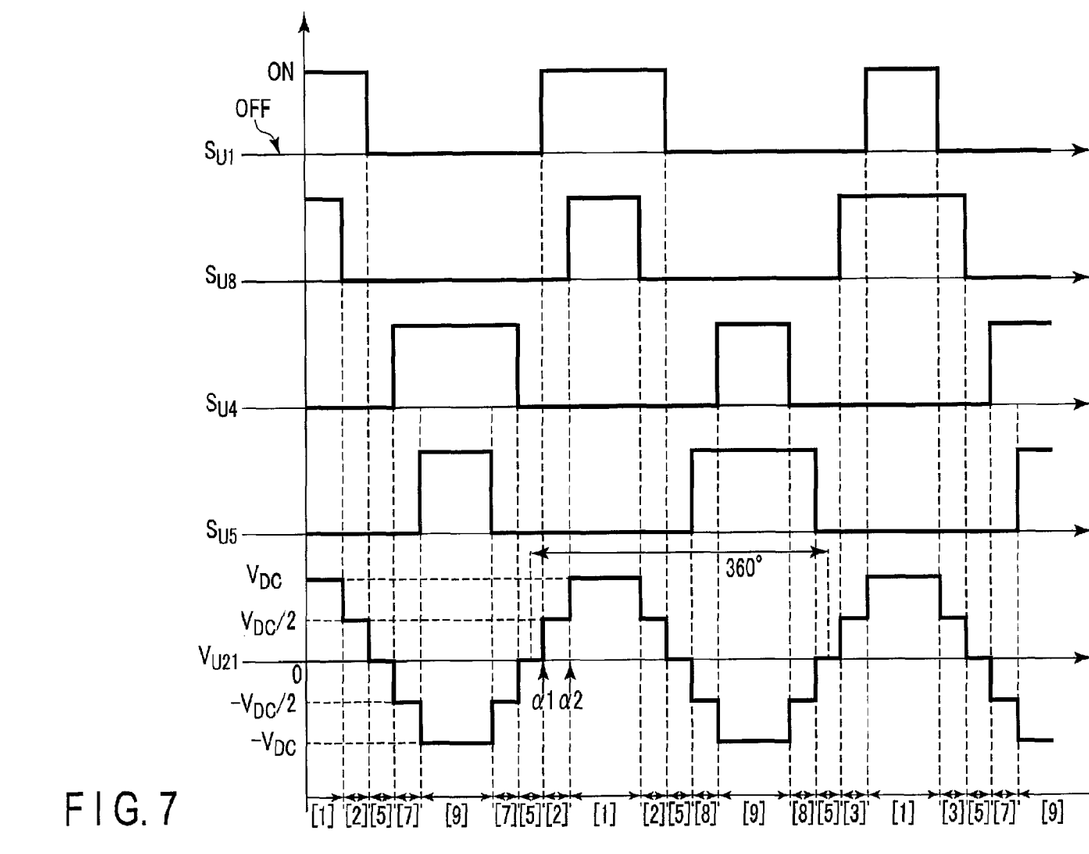
FIG. 7 shows an example of a timing chart of the switching element state and an output voltage of the power conversion device unit $CNV_U$ in the embodiment.

FIG. 7 shows an example of a timing chart of the switching element state and an output voltage of the power conversion device unit $CNV_U$ in the embodiment. FIG. 7 shows a switching pattern and a timing chart of a DC winding voltage $V_{U21}$ of the power conversion device unit $CNV_U$.

The power conversion device unit $CNV_U$ outputs voltages of rising phases $\alpha_1$ and $\alpha_2$ to the transformer TR. FIG. 7 shows switching patterns of $S_{U1}$, $S_{U4}$, $S_{U5}$, and $S_{U8}$. Since $S_{U2}$, $S_{U3}$, $S_{U6}$, and $S_{U7}$ carry out switching complementary with respect to the above elements, the switching patterns thereof are not shown in FIG. 7.

In order to correspond to the switching patterns shown in FIG. 3, the state of the switching elements with respect to voltage $V_{U21}$ is indicated by [1], [2], [3], [4], [5], [6], [7], [8], and [9].

Two types of switching patterns such as [2] and [3] exist for voltage $+V_{DC}/2$ since the control device 20 selects a switching pattern in accordance with the flowchart in FIG. 5 in order to suppress neutral point potential fluctuations. The same applies for the selection of the two types of switching patterns of [7] and [8] for the output voltage $-V_{DC}/2$.

The operation of the above power conversion device unit $CNV_U$ is also common to the power conversion device units of other phases.

In the manner mentioned above, by the configuration of the power conversion device unit and the control method in the present embodiment, a voltage with less low-order harmonics can be obtained by a one-pulse control in a single phase NPC power conversion device unit.

Furthermore, even in the case where the voltage utilization rate M is a fixed value, by applying phase control, current control becomes possible. In addition, in the present embodiment, since one-pulse control is applied, the number of times of switching of the power conversion device unit can be suppressed, and switching loss can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A power conversion device comprising:
   a neutral-point-clamped power conversion device unit connected to a DC power source comprising three potentials;
   a first condenser connected to a high potential side on a direct current side of the power conversion device unit;
   a second condenser connected in series to the first condenser, and connected to a low potential side on the direct current side; and
   a control unit configured to control ON/OFF of a switching element of the power conversion device unit, wherein
   the power conversion device unit includes a plurality of legs which include a plurality of switching elements connected in series in each of three phases,
   the control unit:
      drives the power conversion device unit by a one-pulse control;
      controls a phase difference of an output voltage of the power conversion device unit with respect to a reference phase of a system voltage to control an active current component of an output current of the power conversion device unit;
      controls ON/OFF of the plurality of switching elements by switching a switching pattern of the plurality of switching elements based on:
         (a) a phase angle for eliminating a predetermined odd-order harmonic component of the output voltage of the power conversion device unit; and

(b) a sum of the reference phase and the phase difference;

the switching pattern of the plurality of switching elements includes a plurality of switching patterns in which each of the plurality of switching elements in a same leg operates complementarily, and switching the switching pattern of the plurality of switching elements includes switching the switching pattern to one of the plurality of switching patterns, based on whether a potential of the first condenser is higher than a potential of the second condenser or lower, whether or not a direction of the output current is positive, and whether or not a polarity of the output voltage is positive, in a manner to suppress a neutral point potential fluctuation of the power conversion device unit.

2. The power conversion device according to claim 1, wherein the phase angle for eliminating the predetermined odd-order harmonic component is a first phase angle for eliminating a fifth-order harmonic component and a second phase angle for eliminating a seventh-order harmonic component, the first phase angle being 0.09 rad, and the second phase angle being 0.54 rad.

3. The power conversion device according to claim 1, wherein the power conversion device unit outputs a three-phase AC voltage, and the phase angle for eliminating the predetermined odd-order harmonic component is a phase angle that eliminates harmonic components of a fifth-order or above of the output voltage of the power conversion device unit.

4. A method for controlling ON/OFF of a switching element of a neutral-point-clamped power conversion device unit connected to a DC power source comprising three potentials, the power conversion device unit including a plurality of legs which include a plurality of switching elements connected in series in each of three phases, the method comprising:

driving the power conversion device unit by a one-pulse control;

controlling a phase difference of an output voltage of the power conversion device unit with respect to a reference phase of a system voltage to control an active current component of an output current of the power conversion device unit;

controlling ON/OFF of the plurality of switching elements by switching a switching pattern of the plurality of switching elements based on:
  (a) a phase angle for eliminating a predetermined odd-order harmonic component of the output voltage of the power conversion device unit; and
  (b) a sum of the reference phase and the phase difference;

wherein the switching pattern of the plurality of switching elements includes a plurality of switching patterns in which each of the plurality of switching elements in a same leg operates complementarily, and switching the switching pattern of the plurality of switching elements includes switching the switching pattern to one of the plurality of switching patterns, based on whether a potential of a first condenser connected to a high potential side on a direct current side of the power conversion device unit is higher than a potential of a second condenser connected in series to the first condenser and connected to a low potential side on the direct current side or lower, whether or not a direction of the output current is positive, and whether or not a polarity of the output voltage is positive, in a manner to suppress a neutral point potential fluctuation of the power conversion device unit.

* * * * *